UNITED STATES PATENT OFFICE.

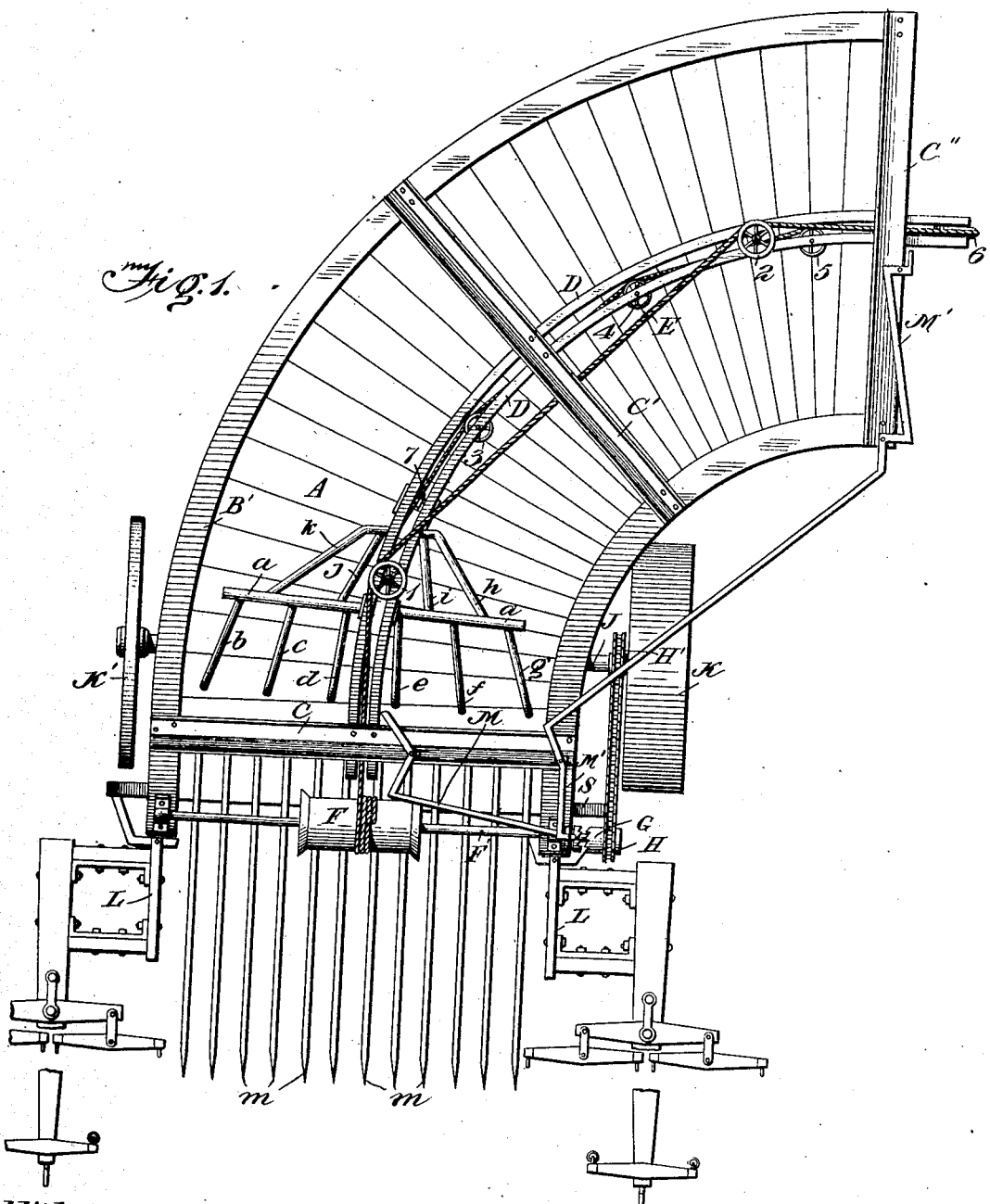

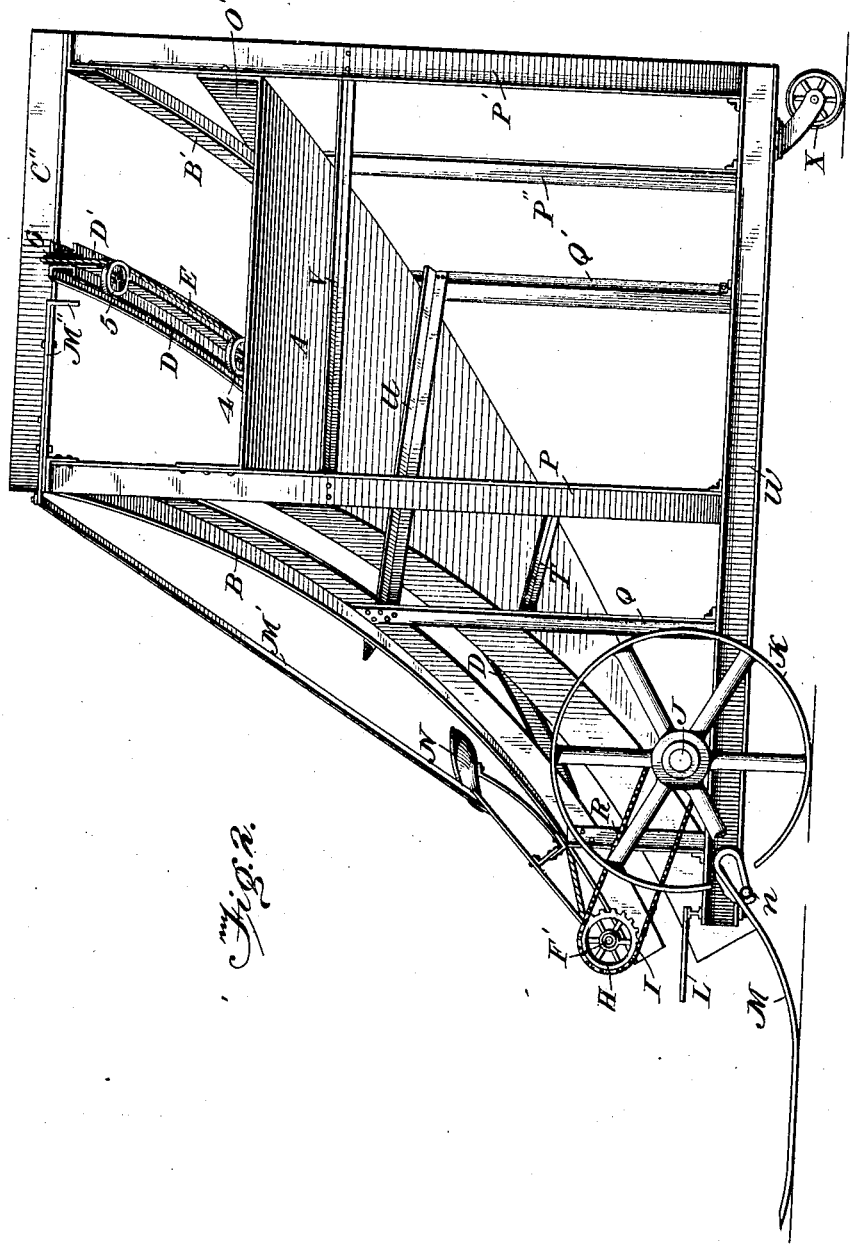

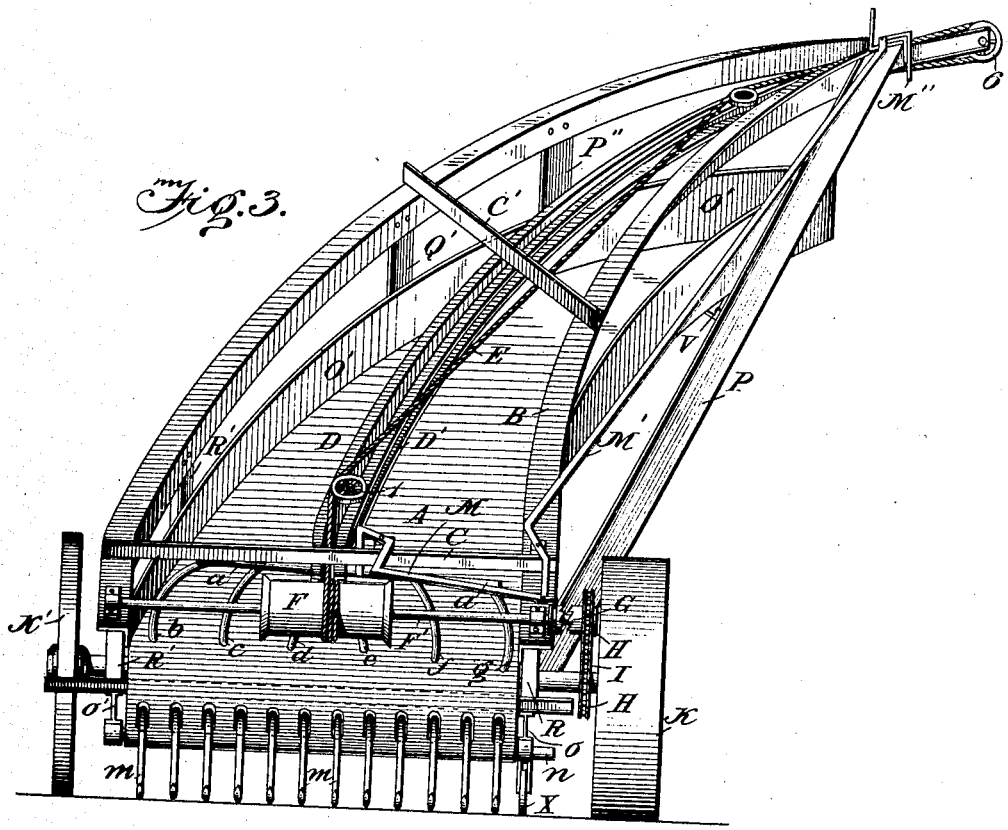

JOHN JAMES, OF OKLAHOMA, OKLAHOMA, ASSIGNOR OF ONE-THIRD TO G. H. RASH, OF OKLAHOMA, OKLAHOMA.

GRAIN-SHOCK ELEVATOR.

No. 892,960.  Specification of Letters Patent.  Patented July 7, 1908.

Application filed January 19, 1907. Serial No. 353,041.

*To all whom it may concern:*

Be it known that I, JOHN JAMES, a citizen of the United States, residing at Oklahoma city, in the county of Oklahoma, Oklahoma, have invented certain new and useful Improvements in Grain-Shock Elevators, of which the following is a specification.

My invention relates to grain shock elevators, in which the frame work is mounted upon wheels one of which rotates the axle having a sprocket wheel thereon operating a drum by means of a chain belt; forwardly projecting fingers adapted to glide under the grain shock are provided, and a several-fingered grab hook is provided to automatically hook over and into the grain shock and by means of the said drum with a rope, a guide and a series of pulleys is forced up the quarter-turn incline and discharged at the side of the machine which will, hereinafter be more fully described.

The objects of my invention are; first, to provide a means for transferring shocks of grain from the ground to wagons or other vehicles without the use of manual labor; second, to save time; third, to save expense. I attain these objects by the mechanism illustrated in the accompanying drawings, forming a part of this specification, in which—

Figure 1 is a plan view of the apparatus or machine; Fig. 2 is a side elevation showing where the grain shock is discharged; Fig. 3 is a front elevation; Fig. 4 is a side elevation of a portion of the trolley track or guide showing the position of the grab hook when about to seize a shock of grain; Fig. 5 is a cross section on line $x$ Fig. 4; Fig. 6 is a cross section on line $x'$ Fig. 4.

Similar letters refer to similar parts in the several views.

Referring to the drawings, A is the floor of the elevator, B and B' are the curved railings, C C' and C'' are the cross-ties which support the trolley guide consisting of the two curved sections of channel iron D and D' having their backs toward each other and blocked apart a short distance. To the said channel iron sections are secured a series of pulleys 1 2 3 4 5 6 and 7, to guide the rope E secured to and operated by the drum F mounted upon the shaft F' and rotated by means of the clutch G, the sprocket pinion H, the sprocket wheel H' and the chain-belt I, said wheel being mounted upon the main shaft J having one end rigidly secured in the drive wheel K the opposite end of said shaft being supported by the wheel K' turning loosely thereon. The grab hook is composed of the head bar $a$, the downwardly curved fingers $b\ c\ d\ e\ f$ and $g$ and the braces $h\ i\ j$ and $k$; the said head bar $a$ being pivotally secured in the pendent support $l$ the head or block portion of which is grooved in a manner adapted to slide upon the lower flanges of the channel irons D and D', see Fig. 7.

L and L are the stub-tongues to which the main tongues $l$ and $l'$ are attached by means of the lateral stays 2 and 3 firmly braced. The forwardly projecting fork fingers or prongs $m$ are preferably formed of gas pipe being curved with the portion slightly back from the point the lowest, their rear ends forming an under-turned loop and entering the rocking shaft $n$ from the rear (see Fig. 2) the object of the loop being to prevent as much as possible the straws from clogging upon the fork prongs $m$.

The levers M and M' are to operate the clutch G and throw the drum F in and out of gear, which is done automatically by the grab hook.

Referring to Fig. 2, N is the seat, O and O' are the fenders to prevent portions of the grain from escaping during its ascent; P and P' are the long posts, Q and Q' are the middle posts and R and R' are the short posts all of which support the cross ties S T U and V and therefore the elevator floor A. The main sill W has secured to its rear end a caster wheel to support that portion of the frame work and to enable the machine to be turned around in a small space.

In operation, as the machine is moved forward, the fingers or prongs $m$ pass under the grain shock and raise the same off the ground, the grab hook fingers $b\ c\ d\ e\ f$ and $g$ drop down and in front of the said shock as the rope E is drawn taut by the drum F, to which the rope is attached, and operated by means of the sprocket wheel H', the sprocket pinion H and the chain belt I. The grab hook forces the grain shock up the incline A and discharges it—presumably into or onto a wagon rack in the proper place to receive it— the instant the said discharge is made the grab hook comes in contact with the downward projection M'' of the lever M' dis-engaging the clutch G and by its own weight permitting the said grab hook to descend to the lower end of the incline where it comes in contact with the lever M causing the engagement of the clutch G which causes the drum F to rotate and the grab hook to make another ascent, and thus the operation is automatically repeated as the machine is moved forward. It will be understood that the machine may be used to take from the ground and elevate a row of sheaves of grain, and also loose grain. It is understood that the driver can at will dis-engage the clutch G and cause the drum and grab hook to remain at rest.

Having thus described my invention, what I claim as new and useful and desire to secure by Letters Patent is—

1. In a grain shock elevator, a frame mounted on wheels and consisting of sills upright side and corner posts having their feet secured to said sills, the rear posts being much longer than the front ones and the intermediate ones having their upper ends in alinement with those of the front and rear, the cross-ties T U and V secured to said posts, the floor of the elevator supported by said cross-ties and having from front to rear a quarter-turn and an upward inclination upon which floor the shocks of grain slide during their upward movement or ascent, the guide-walls O and O' extending from the floor upward each being secured to its respective posts the purpose being to confine the grain to the winding path in its ascent, the railings B and B' secured to the tops of the said posts and having the same general curvature as the said guide-walls to aid in confining the grain within certain bounds and supporting other parts of the machine, the cross-beams C and C' having each end resting upon and secured to the said railings to stay the same and support other parts, the trolley or cable-guide located mid-way between the said railings and some distance above the floor being attached to the said crossbeams and consisting of two parallel L-shaped strips secured to each other a little distance apart with their feet projecting apart and their upper ends extending some distance beyond the end of the said floor, a series of pulleys secured to said cable-guide to direct and to guide the grain, a rope or cable operating in said pulleys, a grab-hook attached to one end of the said rope or cable to hook into the grain, a rotatable drum F having the said rope or cable attached thereto for the purpose of dragging the grain up its path to the point of discharge, the said drum being mounted upon a horizontal shaft, a slidable clutch mounted upon said shaft to rotate said drum, a sprocket wheel adapted to rotate upon said shaft and be engaged by the said clutch, means for engaging and dis-engaging said clutch, a belt for rotating said sprocket wheel, a series of forwardly projecting fingers or prongs adapted to slide under the shocks of grain the rear end of said fingers turning downward and forward a rocker-shaft having its ends pivotally secured in the front portion of the machine, the rear ends of the fingers being secured therein the main shaft J rotated by the main traction wheel of the machine, and having secured thereon a sprocket wheel which by means of a chain belt rotates the sprocket wheel mounted upon the shaft of the said drum, a dependent guide-pulley block provided with lips resting upon and adapted to slide upon the feet or flanges of the said cable-guide the pulley in said block carrying the cable or rope, all substantially as described and for the purposes set forth.

2. In a grain shock elevator; a frame consisting of sills, upright side and corner posts having their feet secured to said sills and being in pairs of unequal length of which the rear are the longest; cross-ties secured to said posts; a floor supported by said cross-ties and having from front to rear a quarter-turn and an upward inclination; a guide wall extending upward from each side of the floor and being secured to said posts to form a chute; railings secured to the tops of said posts and above said guide walls to assist in guiding the grain in its ascent; cross-beams having their ends resting upon and secured to said railings to constitute ties and supports; a cable-guide attached to the under side of said cross-beams midway their ends and having its rear end extend beyond the said floor to carry the grain beyond the margin thereof, said cable-guide being formed of two slightly separated parallel strips having outwardly projecting flanges or feet, the said cable-guide having a quarter-turn to aid in guiding the grain in its ascent; a cable pulley mounted in the rear end of said cable-guide; a drum secured upon a horizontal rotatable shaft secured in the forward part of said frame; a grab-hook slidably attached to said cable-guide and having a head portion and forwardly and downwardly projecting fingers to hook over and into the grain; a cable having one of its ends secured to said grab-hook and its opposite end passed over said cable pulley and around said drum and secured thereto to drag the grain up the said chute and discharge the grain; a guide-pulley 2 secured to the upper surface of the upper portion of said cable-guide to direct the cable over the cable pulley in the upper end of said cable-guide; the guide-pulley 1 secured to the upper surface of the lower portion of the cable-guide to direct the cable over the said drum; means for maintaining the cable between the parallel members of the said cable-guide; a slidable guide block having lips adapted to overlap and rest upon the said flanges or feet of the members of the cable-guide and having a pulley attached to its pendent portion to carry the said cable; a plurality of cable guide-pulleys secured to said cable-guide intermediate its ends to direct and relieve friction of said cable; a grab-hook supporting block slidably attached to said cable-guide and having the grab-hook pivotally secured therein; wheels carrying said frame and an axle having secured thereon a sprocket wheel serving as a motor agent; a sprocket pinion loosely mounted upon the drum shaft to intermittently rotate the same; a chain belt engaging said sprocket wheel and said sprocket pinion to actuate the same; a ratchet secured upon the drum shaft in a manner to slide thereon longitudinally and engage said sprocket pinion to rotate said shaft; means for engaging and disengaging said ratchet with said sprocket pinion; a plurality of levers and rods attached to said ratchet, to the front cross-beam and to the rear cross-beam and adapted to be contacted by the grab-hook to dis-engage the clutch and pinion; a rocking-shaft having its ends pivotally secured in the sides of the front end of the machine frame; a shock-lifting fork having forwardly projecting fingers adapted to glide under the grain shocks and having their rear ends downwardly and forwardly bent and secured in said rocking-shaft to loosen the shocks from the ground and bring them within reach of the grab-hook; right and left off-set tongues attached to the machine for hitching the teams to, substantially as described and for the purposes set forth.

In testimony whereof I affix my signature in presence of two witnesses.

JOHN JAMES.

Witnesses:
E. C. THOME,
M. E. GREENMAN.